(12) United States Patent
Matalanis et al.

(10) Patent No.: US 9,132,914 B2
(45) Date of Patent: Sep. 15, 2015

(54) LOW DRAG HIGH RESTORING MOMENT AIRFOILS

(75) Inventors: Claude G. Matalanis, East Hartford, CT (US); Brian E. Wake, South Glastonbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 404 days.

(21) Appl. No.: 13/561,399

(22) Filed: Jul. 30, 2012

(65) Prior Publication Data
US 2014/0030103 A1    Jan. 30, 2014

(51) Int. Cl.
*B64C 7/00*    (2006.01)
*B64C 27/10*   (2006.01)
*B64C 23/00*   (2006.01)

(52) U.S. Cl.
CPC . *B64C 27/10* (2013.01); *B64C 7/00* (2013.01); *B64C 23/00* (2013.01)

(58) Field of Classification Search
CPC ................................ B64C 27/08; B64C 27/10
USPC .................................................. 416/128, 129
See application file for complete search history.

(56) References Cited

U.S. PATENT DOCUMENTS

| | | |
|---|---|---|
| 2,461,348 A | 2/1949 | Pentecost |
| 4,537,146 A | 8/1985 | Wainwright |
| 4,744,728 A | 5/1988 | Lednicer et al. |
| 6,270,038 B1 | 8/2001 | Cycon et al. |
| 6,343,768 B1 | 2/2002 | Muldoon |
| 7,014,142 B2 | 3/2006 | Barocela et al. |
| 7,530,787 B2 | 5/2009 | Bertolotti et al. |
| 7,600,976 B2 | 10/2009 | Bagai et al. |
| 7,665,688 B2 | 2/2010 | Cylinder et al. |
| 7,854,593 B2 | 12/2010 | Owen |
| 7,871,032 B2 | 1/2011 | Zhao et al. |
| 2007/0166163 A1* | 7/2007 | Bertolotti et al. ......... 416/134 A |

* cited by examiner

*Primary Examiner* — Richard Edgar
(74) *Attorney, Agent, or Firm* — Cantor Colburn LLP (57) ABSTRACT

A rotor hub fairing system for use in a counter-rotating, coaxial rotary wing aircraft is provided including an upper hub fairing defined about an axis. A lower hub fairing is similarly defined about the axis. An airfoil shaped shaft fairing is disposed between the upper hub fairing and the lower hub fairing. The airfoil shaped shaft fairing has a thickness to chord (t/c) ratio in the range of about 20% and about 45%.

8 Claims, 10 Drawing Sheets

LOW DRAG HIGH RESTORING MOMENT AIRFOILS

BACKGROUND OF THE INVENTION

Exemplary embodiments of the invention relate to a rotor hub fairing system, and more particularly, to a rotor hub fairing system that reduces overall drag for a high speed rotary wing aircraft having a counter-rotating, coaxial rotor system.

Typically, aerodynamic drag associated with a rotor system of a rotary wing aircraft is a significant portion of the overall aircraft drag, commonly 25% to 30% for conventional single-rotor helicopters. The rotor system drag increases for a rotary wing aircraft having a counter-rotating coaxial system primarily due to the additional rotor hub and the interconnecting main rotor shaft assembly between the upper and lower rotor systems. For high speed rotary-wing aircrafts, the increased drag resulting from counter-rotating coaxial rotor system may cause a relatively significant power penalty.

The aerodynamic drag of the dual counter-rotating, coaxial rotor system is generated by three main components—the upper hub, the lower hub, and the interconnecting main rotor shaft assembly. The drag contributions may be approximately 40% for each of the rotor hubs, and 20% for the interconnecting shaft assembly.

Fairings have been used in conventional rotary wing aircrafts to reduce the drag. The implementation of a fairing in an application having airfoils with a large thickness to chord ratio is more complex because of the negative restoring moment of the thick airfoils. By incorporating a more complex mechanism and controller, the benefit of the fairings is ultimately reduced.

BRIEF DESCRIPTION OF THE INVENTION

According to one embodiment of the invention, a rotor hub fairing system for use in a counter-rotating, coaxial rotary wing aircraft is provided including an upper hub fairing defined about an axis. A lower hub fairing is similarly defined about the axis. An airfoil shaped shaft fairing is disposed between the upper hub fairing and the lower hub fairing. The airfoil shaped shaft fairing has a thickness to chord ratio in the range of about 20% and about 45%.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1A:
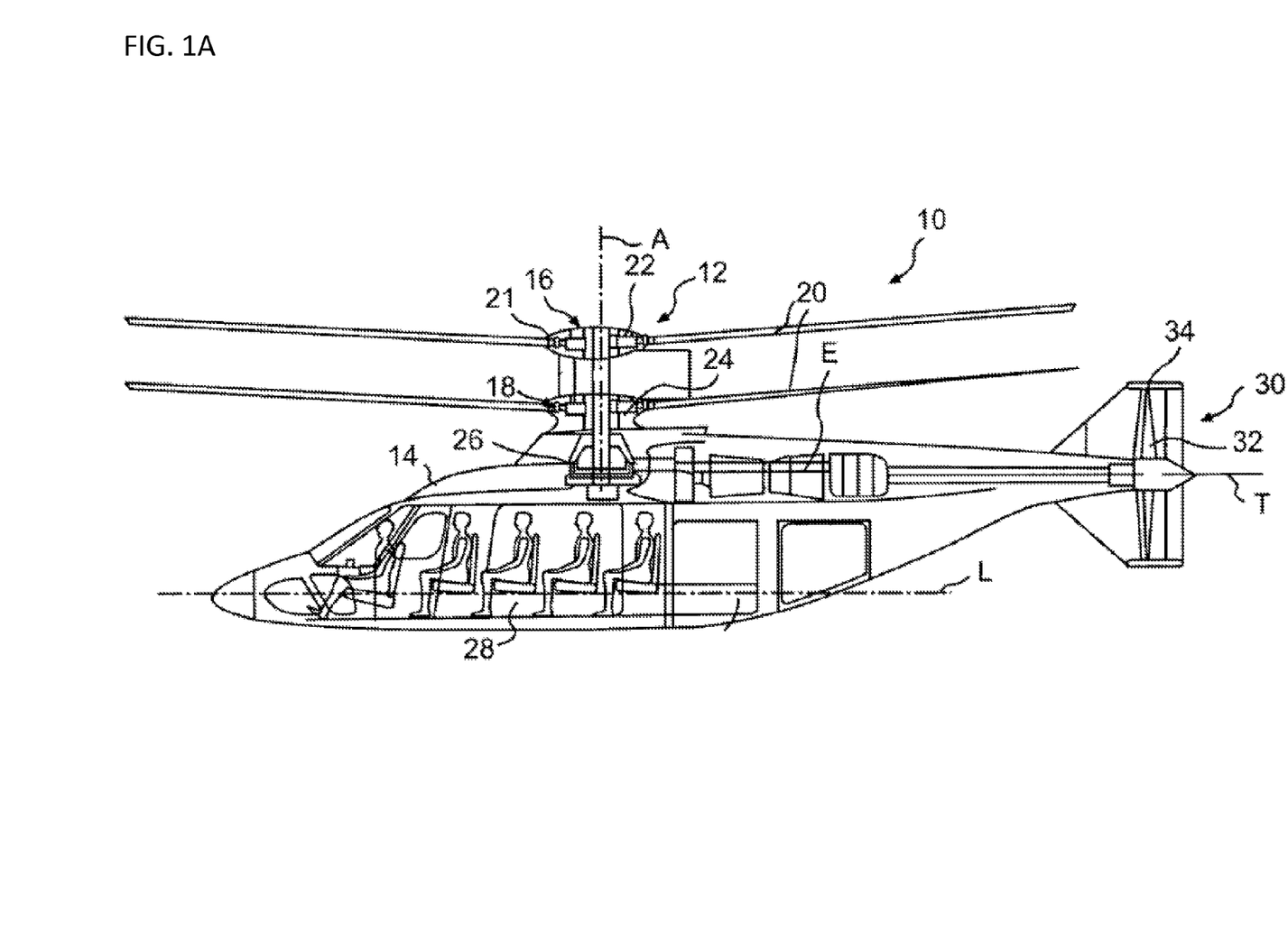
FIGS. 1A and 1B are general side views of an exemplary rotary wing aircraft for use with the present invention.
Figure 1B:
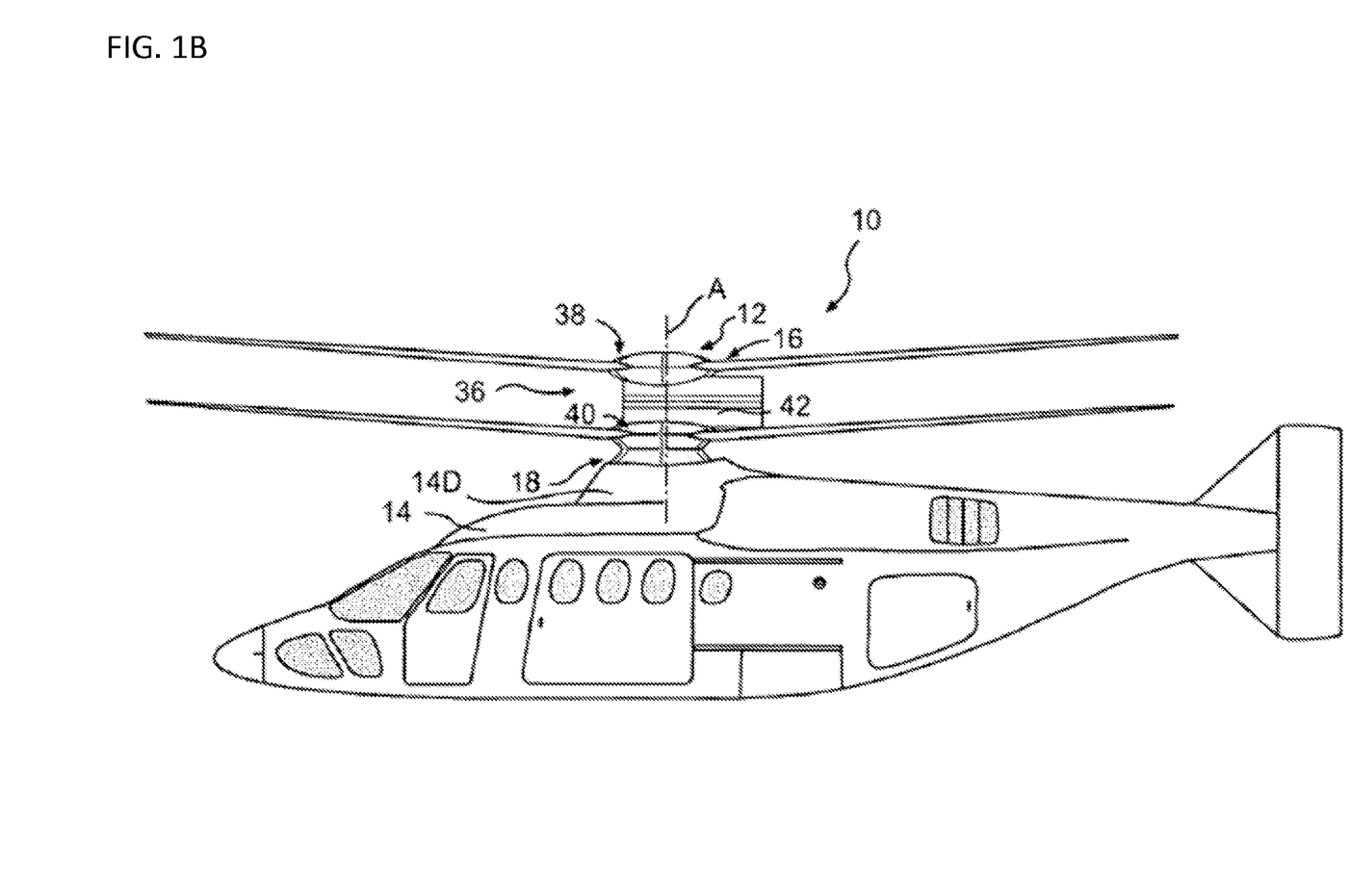

A high speed compound rotary-wing aircraft with a dual, contra-rotating, coaxial rotor system as shown in FIGS. 1A and 1B is capable of travel at higher speeds than conventional single rotor helicopters due in part to the balance of lift between the advancing side of the main rotor blades on the upper and lower rotor systems. In addition, the retreating sides of the rotors are also generally free from classic retreating blade stall that conventional single or tandem rotor helicopters may suffer from.

FIGS. 1A and 1B illustrate an exemplary high speed compound rotary wing aircraft 10 having a dual, counter-rotating, coaxial rotor system 12. The aircraft 10 includes an airframe 14 that supports the dual, counter-rotating, coaxial rotor system 12 as well as a translational thrust system 30 which provides translational thrust generally parallel to an aircraft longitudinal axis L. Although a particular aircraft configuration is illustrated, other rotary wing aircraft configurations are within the scope of the invention. The dual counter-rotating, coaxial rotor system 12 includes a first rotor system 16, such as an upper rotor system for example, and a second rotor system 18, such as a lower rotor system for example. Each rotor system 16, 18 includes a plurality of rotor blades 20 mounted to a rotor hub assembly 22, 24 for rotation about a rotor axis of rotation A. The plurality of main rotor blades 20 project substantially radially outward from each of the hub assemblies 22, 24 and are connected thereto in any manner known to a person skilled in the art. Any number of rotor blades may be used with the dual counter-rotating, coaxial rotor system 12.

The dual, counter-rotating, coaxial rotor system may be driven by a main gearbox 26 located above the aircraft cabin. A translational thrust system 30 may be mounted to the rear of the airframe 14 with a rotational axis T oriented substantially horizontal and parallel to the aircraft longitudinal axis L to provide thrust for high-speed flight. In one embodiment, the translational thrust system 30 includes a pusher propeller 32 mounted within an aerodynamic cowling 34. The translational thrust system 30 may be driven by the same gearbox 26 that drives the rotor system 12. The main gearbox 26 is driven by one or more engines E and may be positioned between the gas turbine engines E and the translational thrust system 30.

The rotor system 12 may also include a rotor hub fairing system 36 (FIG. 1B) generally located between the upper and lower rotor systems 16, 18 such that the rotor hubs 22, 24 are at least partially contained therein. It is known that a significant portion of the overall aircraft drag on a vertical take-off and landing (VTOL) aircraft is due to the main rotor system. The rotor system drag increases for a rotary wing aircraft having a counter-rotating, coaxial rotor system primarily due to the interconnecting rotor shaft assembly between the upper and lower rotor systems 16, 18. Additionally, the aerodynamic drag on a counter-rotating, coaxial rotor system 12 may be dominated by the pressure drag resulting from large-scale flow separation; typically the skin-friction drag may contribute about 10% of overall aircraft drag. The rotor hub fairing system 36 achiever a significant drag reduction in which large scale flow separation is greatly reduced.

The rotor hub fairing system 36 includes an upper hub fairing 38, a lower hub fairing 40 and a shaft fairing 42 therebetween. The rotor hub fairing system 36 is sized and configured to reduce interference effects between the separate fairing components 38, 40, 42 and to minimize flow separation in the junction areas. The shaft fairing 42 may follow the contours of the upper hub fairing 38 and the lower hub fairing 40 at the rotational interfaces therebetween. In one embodiment, the lower hub fairing 40 is sized and configured to follow the contours of the airframe 14 in an area near a pylon 14D.

Figure 2:
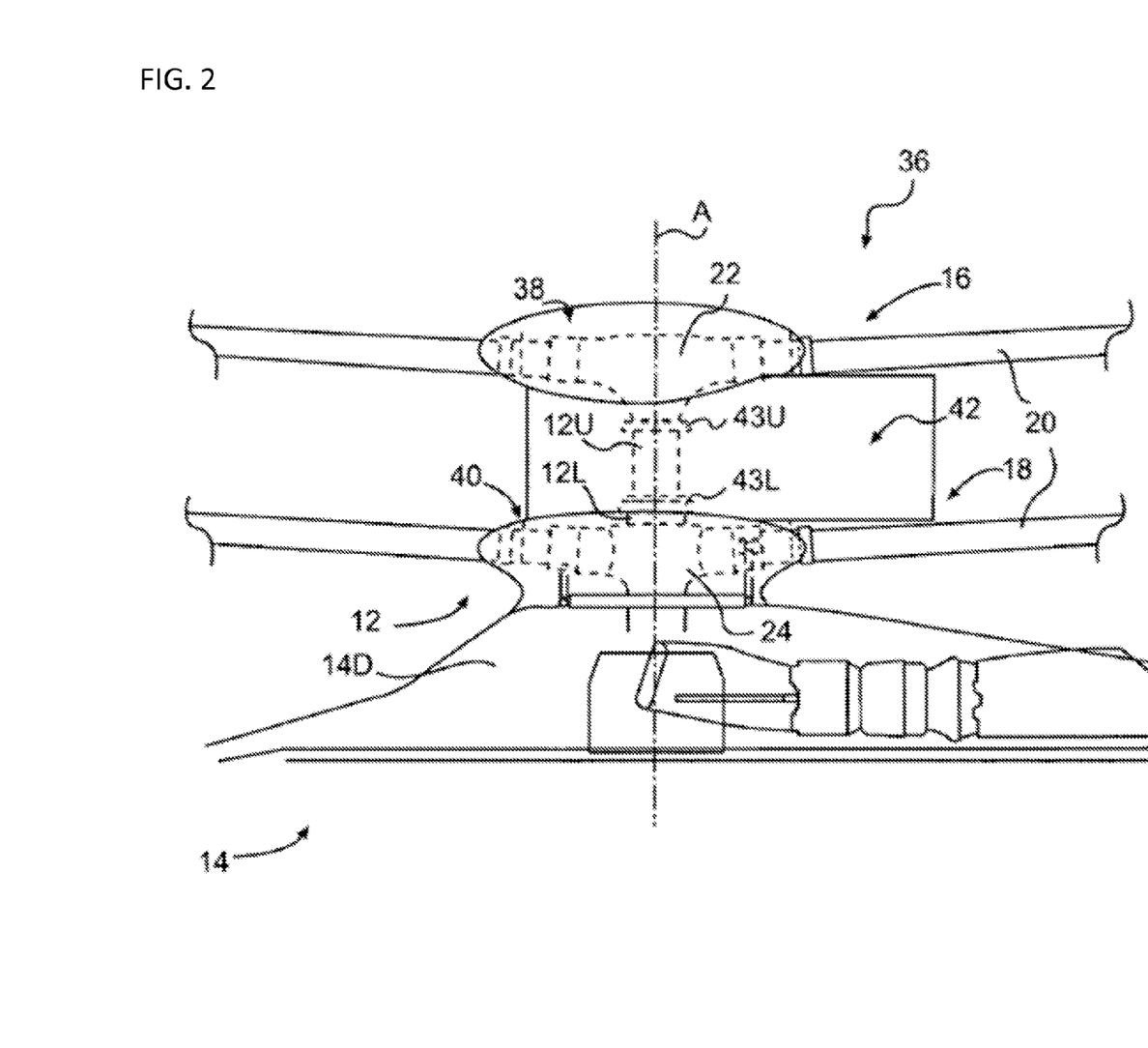
FIG. 2 is an expanded partial phantom view of a counter-rotating coaxial rotor system with a rotor hub fairing system according to the invention.

In one embodiment, illustrated in FIG. 2, the shaft fairing 42 is attached to the counter-rotating coaxial rotor system 12 through a bearing arrangement 43U, 43L such that the shaft fairing 42 is aligned with the relative wind in forward flight but is free to pivot about the axis A, such as during low speed maneuvering for example. The upper bearing 43U and the lower bearing 43L are respectively located adjacent an upper portion and a lower portion of the shaft fairing 42. The upper bearing 43U may attach to one rotor shaft while the lower bearing 43L may attach to the other rotor shaft such that the bearings 43U, 43L are counter-rotating and the net bearing drag is relatively low. Other mechanisms for attaching the shaft fairing 42 to the counter-rotating, coaxial rotor system 12 may be used.

Figure 3:
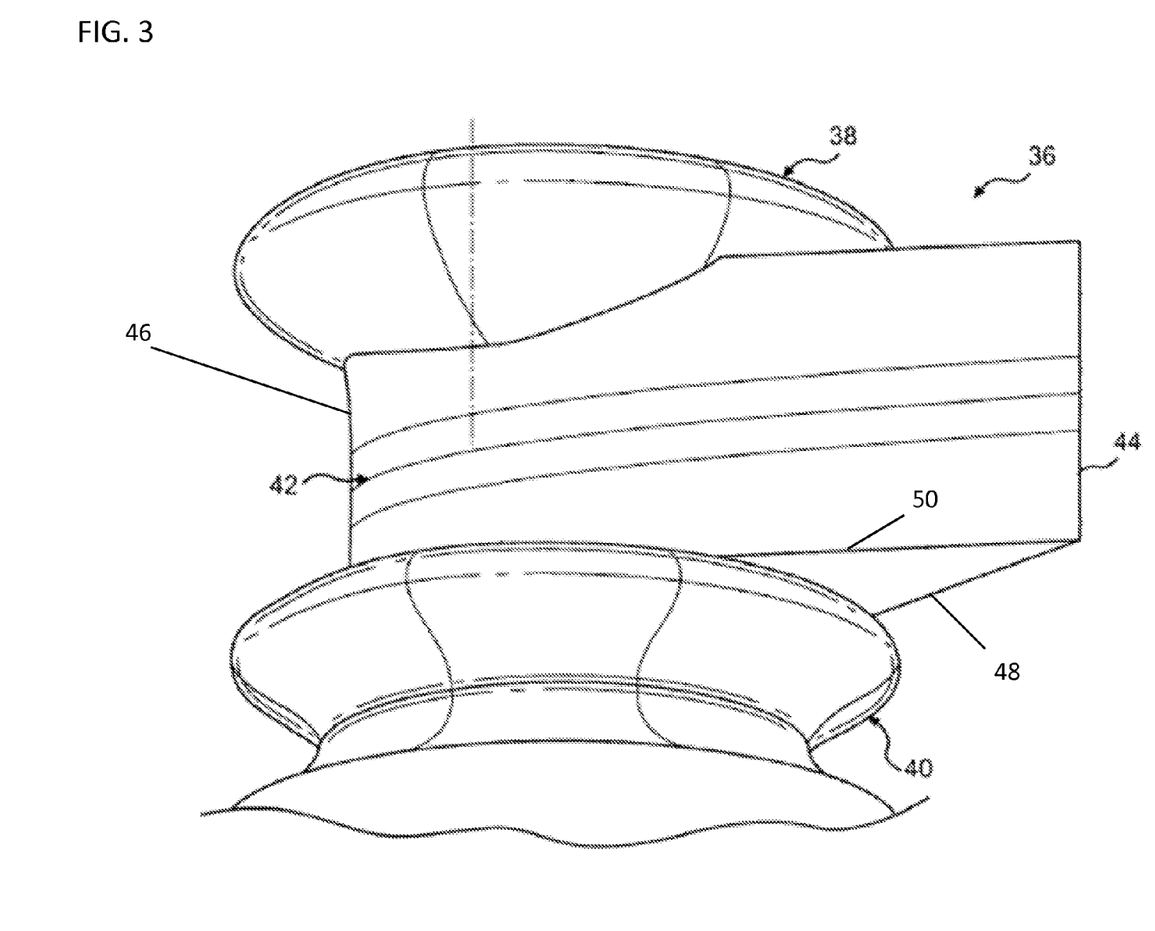
FIG. 3 is an oblique aft perspective view of a rotor hub fairing system according to an embodiment of the invention.

Referring to FIGS. 2 and 3, an exemplary rotor hub fairing system 36 is illustrated having generally elliptical, in cross-section, upper and lower hub fairings 38, 40 and an airfoil-type shape (in horizontal cross-section) for the shaft fairing 42. The airfoil shape of the shaft fairing 42 includes a leading edge 46, and a trailing edge 44 aft of the upper and lower fairings 38, 40. The airfoil shape of the shaft fairing 42 additionally includes a chord (not shown) that connects the leading and trailing edges 46, 44 of the airfoil. In one embodiment, the airfoil shape, including the upper surface 48 and the lower surface 50, is symmetrical about a plane extending along the length of the shaft fairing 42 and containing the axis of rotation A.

The design methodology employed for designing various airfoil profiles of the shaft fairing 42 included beginning with an existing airfoil shape, for example the NACA 0028, which was revised using multi-point optimization techniques until a desired level of performance was attained. As generally understood, it is desirable to design an airfoil for a shaft fairing 42 having a positive restoring moment as well as a low drag coefficient.

Figure 7:
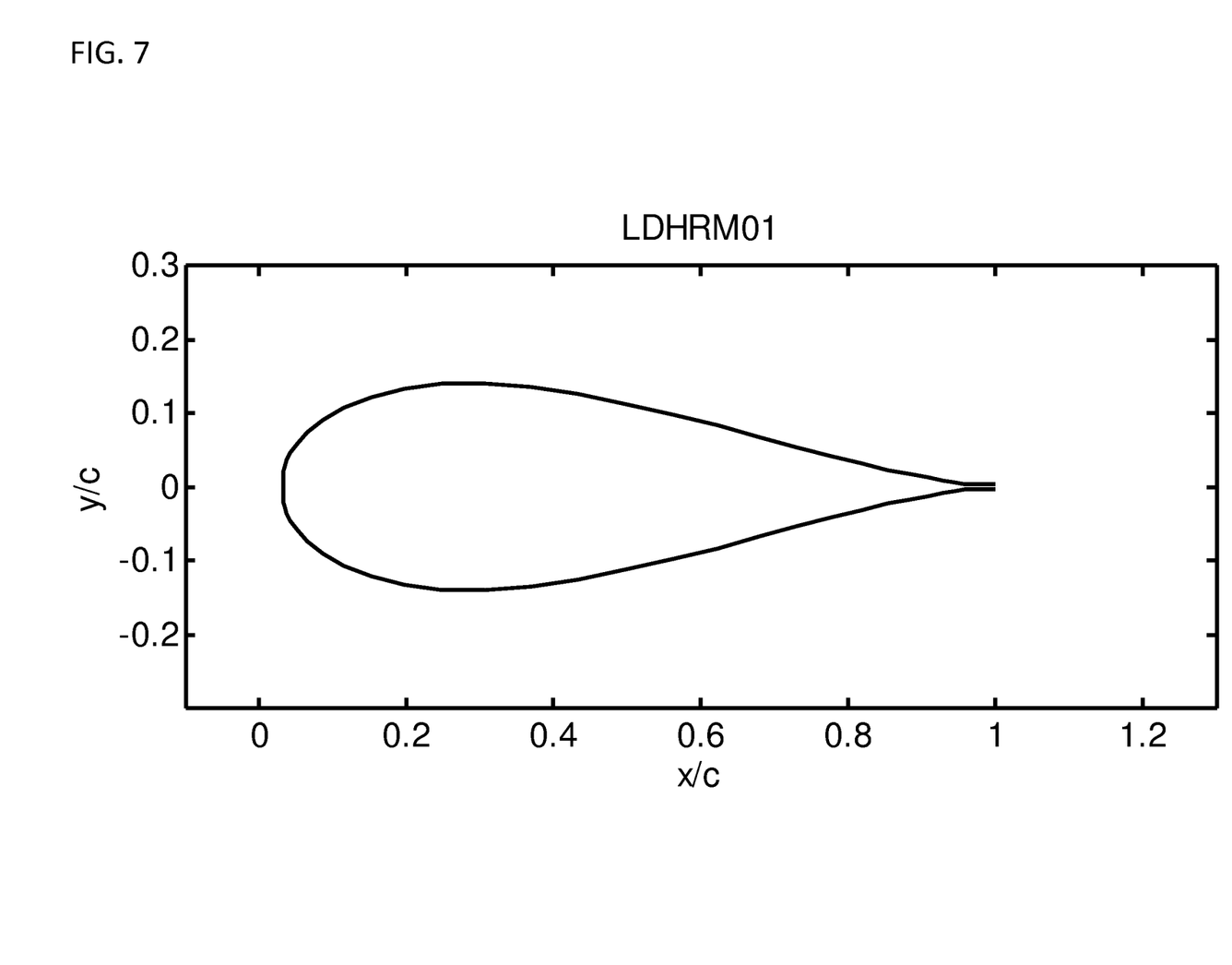
FIG. 7 is a schematic view of an airfoil shape of the shaft fairing of the rotor hub fairing system according to an embodiment of the invention.
Figure 8:
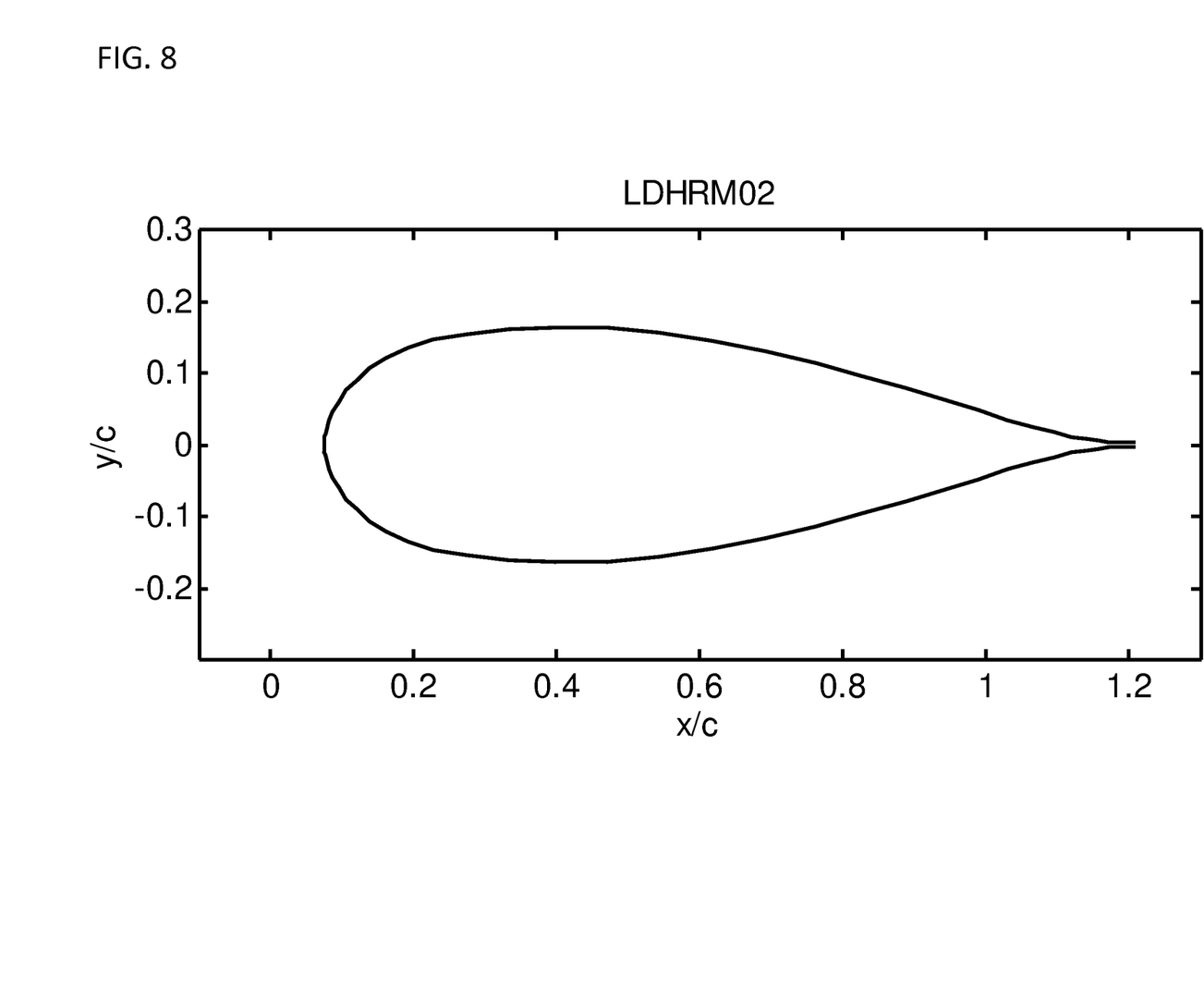
FIG. 8 is a schematic view of an airfoil shape of the shaft fairing of the rotor hub fairing system according to an embodiment of the invention.
Figure 9:
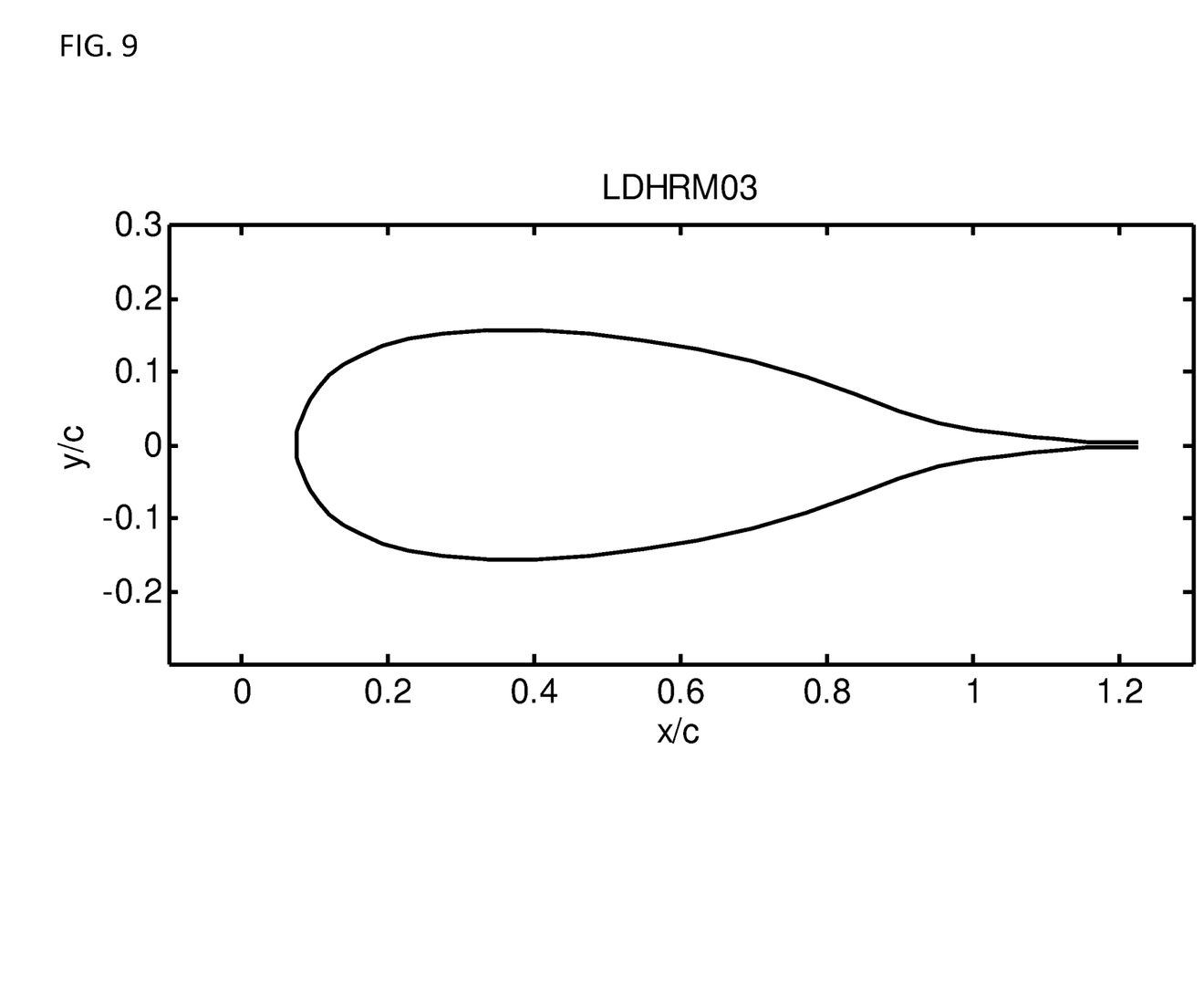
FIG. 9 is a schematic view of an airfoil shape of the shaft fairing of the rotor hub fairing system according to an embodiment of the invention.

FIGS. 7-9, illustrate exemplary airfoils that may be utilized in the construction of the shaft fairing 42. The airfoil shape of the shaft fairing has a thickness (distance between the upper surface 48 and the lower surface 50) to chord ratio (t/c) in the range of between about 20% and about 45%. In one embodiment, the thickness to chord ratio (t/c) of the airfoil is about 30%. As generally understood, the described airfoils have been found to balance a low coefficient of drag with a positive restoring moment at 0.5 Mach.

Figure 4:
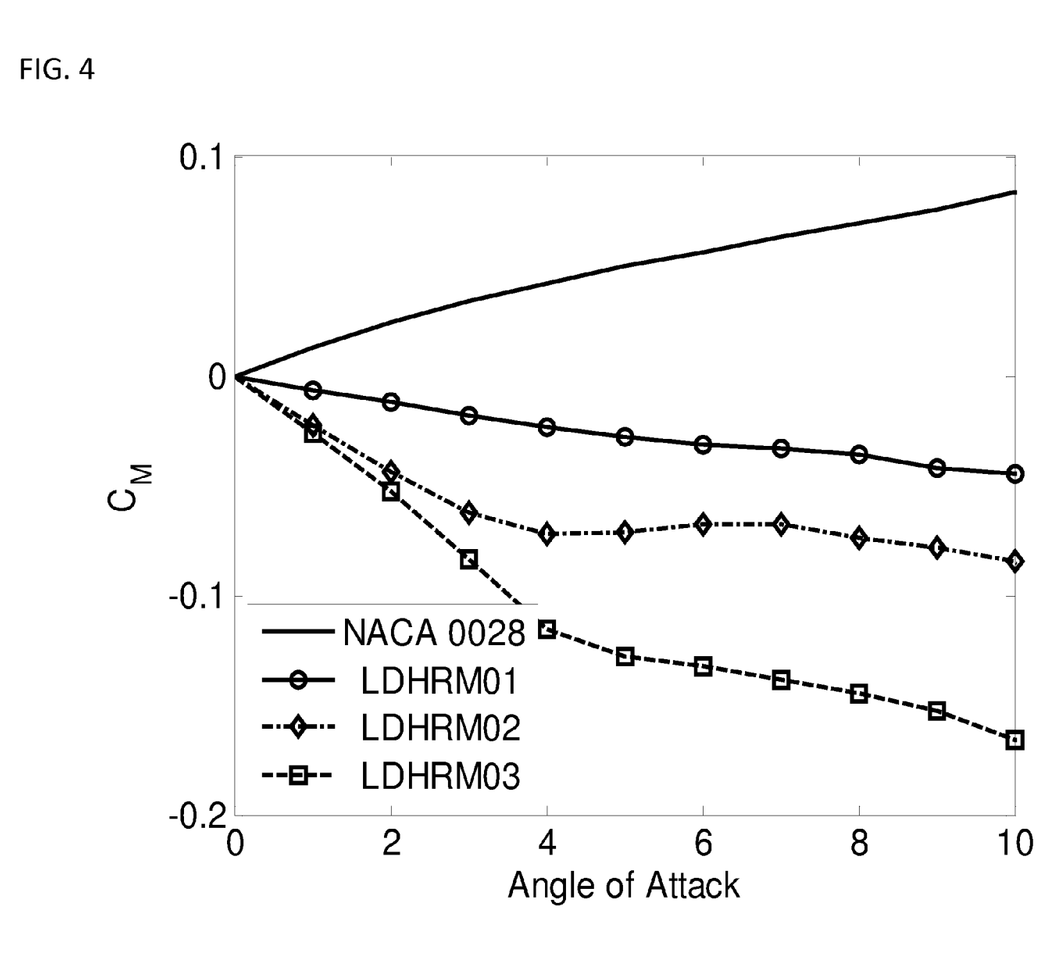
FIG. 4 is a graph comparing moment coefficients as a function of angle of attack for various airfoils according to an embodiment of the invention.

A comparison of moment coefficients of the airfoils according to various embodiments of the invention is illustrated in FIG. 4. The moment coefficient, $C_M$, is a measure of the nose-up pitching moment. A positive $C_M$ indicates a moment which will tend to rotate the nose of the airfoil up, while a negative $C_M$ indicates a nose down moment. Because baseline airfoil NACA 0028 does not adjust to the airflow, it has a positive moment coefficient that increases with the angle of attack, making the fairing unstable. The airfoil shapes of the present invention, designated as LDHRM01, LDHRM02, and LDHRM03, have a negative moment coefficient that decreases as the angle of attack increases, also known as a positive restoring pitch moment.

Figure 5:
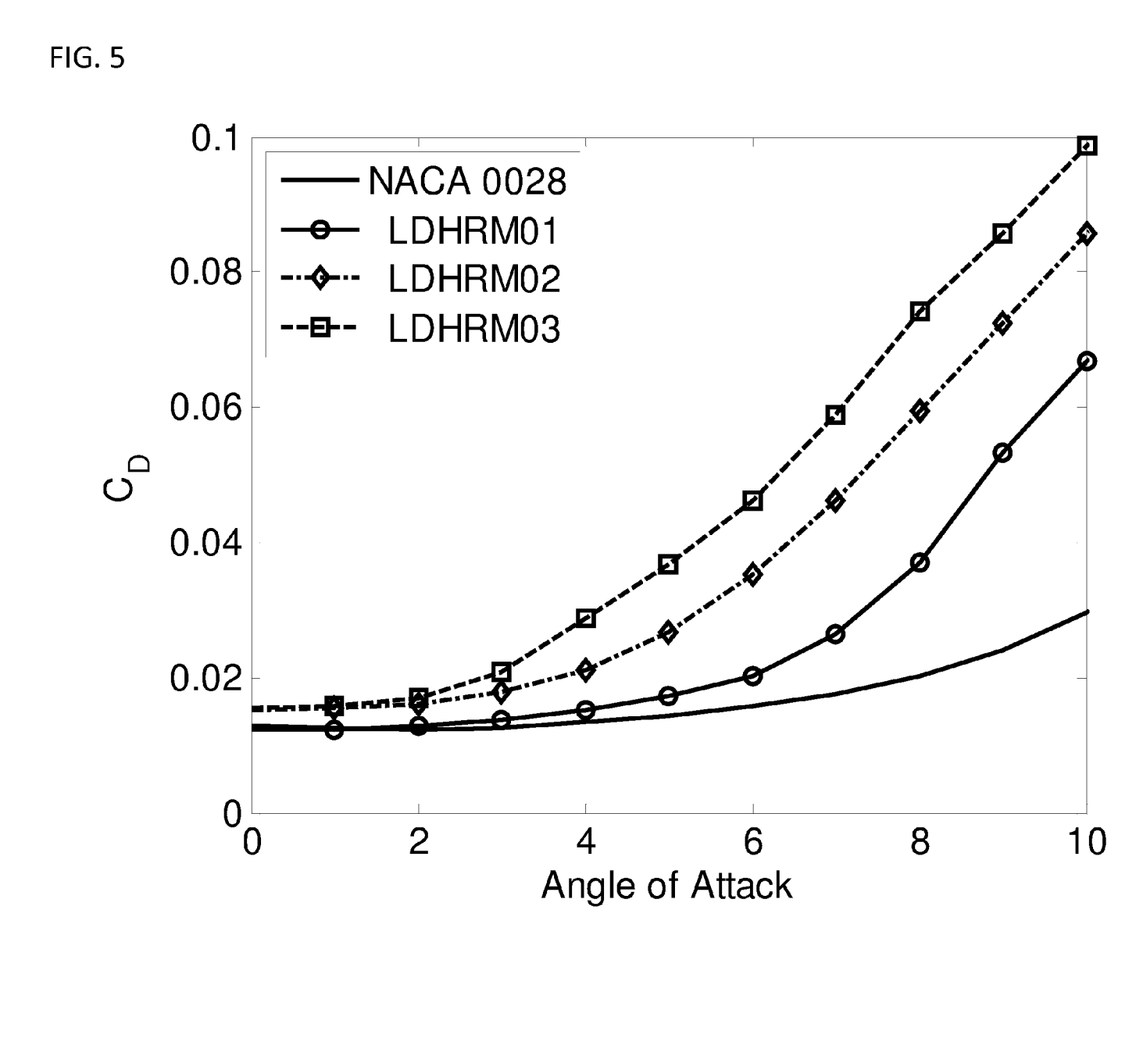
FIG. 5 is a graph comparing drag coefficients with angle of attack for various airfoils according to an embodiment of the invention.

Referring now to FIG. 5, a graphical representation of the drag coefficient, $C_D$, of each airfoil versus the angle of attack is shown. As is known, NACA 0028 exhibits excellent drag properties, and therefore, the line representing the NACA 0028 is the lowest. For an angle of attack between 0 and 2, all of the airfoils have a relatively close drag coefficient between about 0.1 and 0.15. In particular, airfoil LDHRM01 has a drag coefficient nearly identical to the baseline airfoil until the angle of attack is about 4 degrees. Airfoils LDHRM02 and LDHRM03 exhibit similar drag properties until reaching an angle of attack of about 3 degrees.

Figure 6:
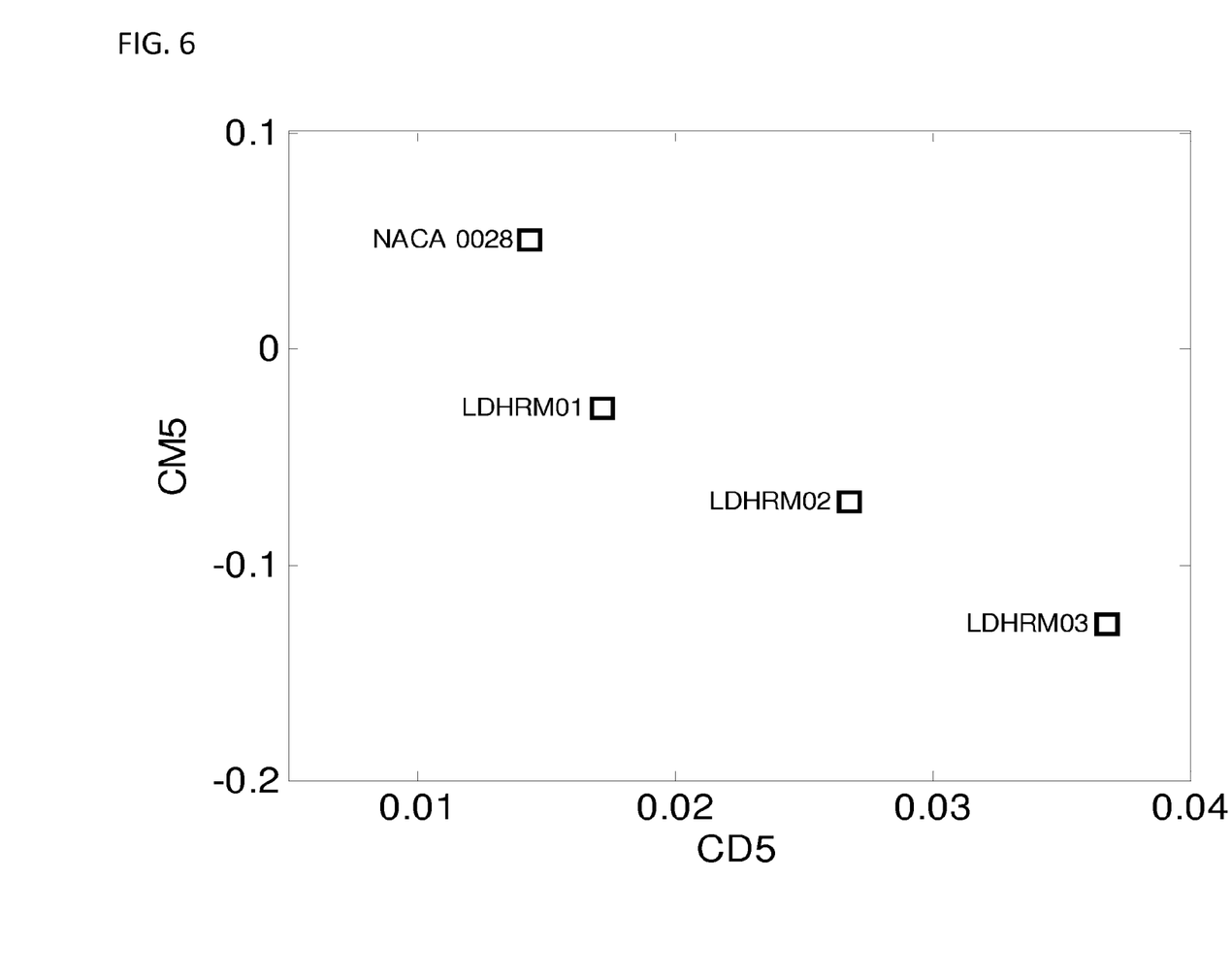
FIG. 6 is a graphical representation of the drag coefficient and moment coefficient of various airfoils according to an embodiment of the invention.

FIG. 6 is a comparison of the moment coefficient $C_M$ at a 5 degree angle of attack, $C_M 5$, and the drag coefficient $C_D$ at a 5 degree angle of attack, $C_D 5$, of each airfoil, including the baseline NACA 0028, on the same plot. Since the moment coefficient $C_M$ is zero at a zero angle of attack for all of these airfoils, as shown in FIG. 4, the $C_M 5$ value is used as an indicator of the slope of the moment coefficient $C_M$. $C_M 5$ values greater than zero indicate a negative restoring pitching moment, and $C_M 5$ values less than zero indicate a positive restoring pitching moment. As illustrated, although baseline NACA 0028 has the lowest drag coefficient $C_D$, it also has a negative restoring pitching moment. Airfoil LDHRM01 has the next lowest drag coefficient $C_D$, but a mildly positive restoring pitching moment. Airfoil LDHRM03 has the highest positive restoring pitching moment, but also the highest drag coefficient $C_D$. With respect to drag and pitching moment, airfoil LHHRM02 is in between LDHRM01 and LDHRM02.

Because of the difficulty involved in giving an adequate word description of the particular airfoil sections being described, the coordinates for the invention airfoil section designated LDHRM01 are set forth in Table 1, the coordinates of the inventive airfoil section designated LDHRM02 are set forth in Table 2, and the coordinates for the inventive airfoil LDHRM03 are set forth in Table 3. The X values represent a distance from a leading edge of the airfoil along a chord, and the Y values represent a vertical distance from the chord to a point on an upper surface of the airfoil. The listed Y values are scaled by a factor between 0.7 and 1.5 such that the airfoil has a thickness to chord ratio between about 20% and about 45%. From the above description of the structural arrangement of the airfoil section, operation of the invention should now become apparent. The conditions of an airfoil of a shaft fairing 42 are a negative pitch moment and a minimum drag coefficient.

TABLE 1

| LDHRM01 | |
|---|---|
| Legacy Name X | V0328 Y |
| 1 | 0.002546 |
| 0.995662 | 0.002518 |
| 0.991217 | 0.002582 |
| 0.98561 | 0.002727 |

TABLE 1-continued

LDHRM01

| Legacy Name X | V0328 Y |
|---|---|
| 0.978558 | 0.003006 |
| 0.969722 | 0.003508 |
| 0.958704 | 0.00439 |
| 0.945056 | 0.005889 |
| 0.928284 | 0.008294 |
| 0.907843 | 0.011854 |
| 0.883137 | 0.016727 |
| 0.853581 | 0.023086 |
| 0.818697 | 0.031223 |
| 0.778161 | 0.041445 |
| 0.731847 | 0.053817 |
| 0.679911 | 0.067796 |
| 0.622922 | 0.082365 |
| 0.56194 | 0.09666 |
| 0.498406 | 0.111061 |
| 0.433676 | 0.125134 |
| 0.368918 | 0.135909 |
| 0.306284 | 0.140599 |
| 0.248253 | 0.139078 |
| 0.196656 | 0.131974 |
| 0.152462 | 0.120792 |
| 0.115843 | 0.106667 |
| 0.08675 | 0.090275 |
| 0.06522 | 0.073477 |
| 0.050852 | 0.058286 |
| 0.042382 | 0.04589 |
| 0.037592 | 0.035852 |
| 0.03493 | 0.027375 |
| 0.03358 | 0.020203 |
| 0.032905 | 0.014269 |
| 0.032537 | 0.009445 |
| 0.032337 | 0.005562 |
| 0.032249 | 0.002461 |
| 0.032228 | 0 |
| 0.032249 | −0.002461 |
| 0.032337 | −0.005562 |
| 0.032537 | −0.009445 |
| 0.032905 | −0.014269 |
| 0.03358 | −0.020203 |
| 0.03493 | −0.027375 |
| 0.037592 | −0.035852 |
| 0.042382 | −0.04589 |
| 0.050852 | −0.058286 |
| 0.06522 | −0.073477 |
| 0.08675 | −0.090275 |
| 0.115843 | −0.106667 |
| 0.152462 | −0.120792 |
| 0.196656 | −0.131974 |
| 0.248253 | −0.139078 |
| 0.306284 | −0.140599 |
| 0.368918 | −0.135909 |
| 0.433676 | −0.125134 |
| 0.498406 | −0.111061 |
| 0.56194 | −0.09666 |
| 0.622922 | −0.082365 |
| 0.679911 | −0.067796 |
| 0.731847 | −0.053817 |
| 0.778161 | −0.041445 |
| 0.818697 | −0.031223 |
| 0.853581 | −0.023086 |
| 0.883137 | −0.016727 |
| 0.907843 | −0.011854 |
| 0.928284 | −0.008294 |
| 0.945056 | −0.005889 |
| 0.958704 | −0.00439 |
| 0.969722 | −0.003508 |
| 0.978558 | −0.003006 |
| 0.98561 | −0.002727 |
| 0.991217 | −0.002582 |
| 0.995662 | −0.002518 |
| 1 | −0.002546 |

TABLE 2

LDHRM02

| Legacy Name X | v9p82 Y |
|---|---|
| 1.2095 | −0.002615 |
| 1.2037 | −0.002612 |
| 1.1981 | −0.0026 |
| 1.1911 | −0.0029 |
| 1.1823 | −0.0033 |
| 1.1714 | −0.0041 |
| 1.1579 | −0.0055 |
| 1.1412 | −0.0078 |
| 1.1209 | −0.0114 |
| 1.0963 | −0.0167 |
| 1.0667 | −0.0243 |
| 1.0316 | −0.0344 |
| 0.9903 | −0.0473 |
| 0.9427 | −0.0626 |
| 0.8887 | −0.0793 |
| 0.8284 | −0.0964 |
| 0.7625 | −0.1134 |
| 0.6919 | −0.13 |
| 0.6184 | −0.1448 |
| 0.5442 | −0.1566 |
| 0.4713 | −0.1634 |
| 0.401 | −0.1647 |
| 0.3352 | −0.1608 |
| 0.2753 | −0.1539 |
| 0.2279 | −0.1469 |
| 0.1921 | −0.1351 |
| 0.163 | −0.1214 |
| 0.1398 | −0.107 |
| 0.1213 | −0.0917 |
| 0.1065 | −0.0756 |
| 0.0953 | −0.06 |
| 0.0874 | −0.046 |
| 0.0821 | −0.0341 |
| 0.0789 | −0.0242 |
| 0.0769 | −0.016 |
| 0.0759 | −0.0095 |
| 0.0755 | −0.0042 |
| 0.0754 | 0 |
| 0.0755 | 0.0042 |
| 0.0759 | 0.0095 |
| 0.0769 | 0.016 |
| 0.0789 | 0.0242 |
| 0.0821 | 0.0341 |
| 0.0874 | 0.046 |
| 0.0953 | 0.06 |
| 0.1065 | 0.0756 |
| 0.1213 | 0.0917 |
| 0.1398 | 0.107 |
| 0.163 | 0.1214 |
| 0.1921 | 0.1351 |
| 0.2279 | 0.1469 |
| 0.2753 | 0.1539 |
| 0.3352 | 0.1608 |
| 0.401 | 0.1647 |
| 0.4713 | 0.1634 |
| 0.5442 | 0.1566 |
| 0.6184 | 0.1448 |
| 0.6919 | 0.13 |
| 0.7625 | 0.1134 |
| 0.8284 | 0.0964 |
| 0.8887 | 0.0793 |
| 0.9427 | 0.0626 |
| 0.9903 | 0.0473 |
| 1.0316 | 0.0344 |
| 1.0667 | 0.0243 |
| 1.0963 | 0.0167 |
| 1.1209 | 0.0114 |
| 1.1412 | 0.0078 |
| 1.1579 | 0.0055 |
| 1.1714 | 0.0041 |

TABLE 2-continued

LDHRM02

| Legacy Name X | v9p82 Y |
|---|---|
| 1.1823 | 0.0033 |
| 1.1911 | 0.0029 |
| 1.1981 | 0.0026 |
| 1.2037 | 0.0025 |
| 1.2095 | 0.0025 |

TABLE 3

LDHRM03

| Legacy Name X | v16p192 Y |
|---|---|
| 1.225 | −0.0025 |
| 1.2192 | −0.0025 |
| 1.2134 | −0.0025 |
| 1.2063 | −0.0026 |
| 1.1974 | −0.0028 |
| 1.1863 | −0.003 |
| 1.1725 | −0.0035 |
| 1.1556 | −0.0042 |
| 1.135 | −0.0056 |
| 1.11 | −0.0076 |
| 1.0799 | −0.0104 |
| 1.0442 | −0.0143 |
| 1.0023 | −0.0202 |
| 0.9539 | −0.0302 |
| 0.899 | −0.0467 |
| 0.8378 | −0.0693 |
| 0.7709 | −0.0937 |
| 0.6993 | −0.1142 |
| 0.6247 | −0.1301 |
| 0.5494 | −0.1428 |
| 0.4752 | −0.1523 |
| 0.4038 | −0.1571 |
| 0.3369 | −0.1564 |
| 0.2759 | −0.1514 |
| 0.2279 | −0.1456 |
| 0.1919 | −0.1348 |
| 0.1624 | −0.1223 |
| 0.1388 | −0.109 |
| 0.1201 | −0.0943 |
| 0.1053 | −0.0782 |
| 0.0942 | −0.0624 |
| 0.0864 | −0.048 |
| 0.0813 | −0.0356 |
| 0.0781 | −0.0252 |
| 0.0763 | −0.0168 |
| 0.0753 | −0.0099 |
| 0.0749 | −0.0044 |
| 0.0747 | 0 |
| 0.0749 | 0.0044 |
| 0.0753 | 0.0099 |
| 0.0763 | 0.0168 |
| 0.0781 | 0.0252 |
| 0.0813 | 0.0356 |
| 0.0864 | 0.048 |
| 0.0942 | 0.0624 |
| 0.1053 | 0.0782 |
| 0.1201 | 0.0943 |
| 0.1388 | 0.109 |
| 0.1624 | 0.1223 |
| 0.1919 | 0.1348 |
| 0.2279 | 0.1456 |
| 0.2759 | 0.1514 |
| 0.3369 | 0.1564 |
| 0.4038 | 0.1571 |
| 0.4752 | 0.1523 |
| 0.5494 | 0.1428 |
| 0.6247 | 0.1301 |
| 0.6993 | 0.1142 |
| 0.7709 | 0.0937 |
| 0.8378 | 0.0693 |
| 0.899 | 0.0467 |
| 0.9539 | 0.0302 |
| 1.0023 | 0.0202 |
| 1.0442 | 0.0143 |
| 1.0799 | 0.0104 |
| 1.11 | 0.0076 |
| 1.135 | 0.0056 |
| 1.1556 | 0.0042 |
| 1.1725 | 0.0035 |
| 1.1863 | 0.003 |
| 1.1974 | 0.0028 |
| 1.2063 | 0.0026 |
| 1.2134 | 0.0025 |
| 1.2192 | 0.0025 |
| 1.225 | 0.0025 |

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotor hub fairing system for use in a counter-rotating, coaxial rotor system comprising:
    an upper hub fairing defined about an axis;
    a lower hub fairing defined about the axis; and
    an airfoil shaped shaft fairing disposed between the upper hub fairing and the lower hub fairing, wherein the airfoil shaped shaft fairing has a thickness to chord ratio in the range of about 20% and about 45% and wherein the airfoil shaped shaft fairing has a negative moment coefficient configured to decrease as an angle of attack of the airfoil shaped shaft fairing increases.

2. The rotor hub fairing according to claim 1, wherein the airfoil shaped shaft fairing has a thickness to chord ratio of about 30%.

3. The rotor hub fairing according to claim 1, wherein the airfoil shaped shaft fairing is defined by a set of coordinates as listed in Table 1, wherein X represents a distance from a leading edge of the airfoil along a chord, and Y represents a vertical distance from the chord to a point on an upper surface of the airfoil.

4. The rotor hub fairing according to claim 1, wherein the airfoil shaped shaft fairing is defined by a set of coordinates as listed in Table 2, wherein X represents a distance from a leading edge of the airfoil along a chord, and Y represents a vertical distance from the chord to a point on an upper surface of the airfoil.

5. The rotor hub fairing according to claim 1, wherein the airfoil shaped shaft fairing is defined by a set of coordinates as listed in Table 3, wherein X represents a distance from a leading edge of the airfoil along a chord, and Y represents a vertical distance from the chord to a point on an upper surface of the airfoil.

6. The rotor hub fairing according to claim 1, wherein the airfoil shaped shaft fairing is defined by a set of X and Y coordinates as listed in one of Table 1, Table 2, and Table 3, and the Y coordinates are scaled by a factor between about 0.7 and about 1.5.

7. The rotor hub fairing according to claim 1, wherein the shaft fairing has a shape complementary to the upper hub fairing and the lower hub fairing.

8. The rotor hub fairing according to claim 1, wherein the upper surface and a lower surface of the shaft fairing are symmetrical.

* * * * *